United States Patent
Gifft

[15] 3,674,923

[45] July 4, 1972

[54] FACSIMILE SYSTEM WITH IMPROVED SCANNING

[72] Inventor: Thomas H. Gifft, Anaheim, Calif.

[73] Assignee: T. H. Gift Co., Inc., Anaheim, Calif.

[22] Filed: June 30, 1969

[21] Appl. No.: 837,545

[52] U.S. Cl. ..........................178/6.6 R, 226/180, 346/74 E, 346/136, 346/139

[51] Int. Cl. .................G01d 15/06, G01d 15/24, H04n 1/22

[58] Field of Search .................178/6.6 R, 6.6 A, 6.6 B, 69.5, 178/5; 346/74 E, 74 ES, 74 SB, 74 CH, 139, 136; 307/233, 246, 254, 255; 328/140; 329/111, 126; 226/180

[56] References Cited

UNITED STATES PATENTS

| | | | |
|---|---|---|---|
| 3,330,907 | 7/1967 | Arimura et al. | 178/6.6 |
| 3,355,547 | 11/1967 | Aratani et al. | 178/6.6 |
| 3,369,082 | 2/1968 | Hibbard | 178/6.6 |
| 3,369,250 | 2/1968 | Gifft | 178/6.6 |
| 3,386,041 | 5/1968 | Bell | 307/233 |
| 2,461,376 | 2/1949 | Feldmeier | 226/180 |

*Primary Examiner*—Bernard Konick
*Assistant Examiner*—Steven B. Pokotilow
*Attorney*—Smyth, Roston & Pavitt

[57] ABSTRACT

A facsimile system includes means to add or subtract control pulses or means to control a voltage controlled oscillator to provide for the proper visual orientation of the facsimile on the facsimile paper. The addition or subtraction of pulses may be accomplished manually or may be accomplished automatically using the phase detector to determine the proper orientation of the visible facsimile. The control of the voltage controlled oscillator may also be accomplished using a phase detector. The invention also includes an automatic frequency selector to provide that the amplitude of the signal applied to the facsimile system has a linear relationship with frequency of the input signal so as to produce the proper facsimile reproduction. The invention also includes the use of a canted roller system to insure that the facsimile paper has the proper tension to prevent shrinkage of the paper which again insures a proper visual output representation of the facsimile.

11 Claims, 7 Drawing Figures

PATENTED JUL 4 1972 3,674,923

SHEET 1 OF 5

INVENTOR:
Thomas H. Gifft

By Smyth, Roston & Pavitt
ATTORNEYS

INVENTOR:
Thomas H. Gifft

By Smyth, Roston & Pavitt

ATTORNEYS

INVENTOR
Thomas H. Gifft

By Smyth, Roston & Pavitt
ATTORNEYS

INVENTOR:
Thomas H. Gifft

By Smyth, Roston & Pavitt
ATTORNEYS

INVENTOR:
Thomas H. Gifft
By Smyth, Roston & Pavitt
ATTORNEYS

FACSIMILE SYSTEM WITH IMPROVED SCANNING

The present invention is directed to a facsimile system and more specifically to improvements in a facsimile system. For example, the improvements in the facsimile system of the present invention may be used in a facsimile system of the type shown in U.S. Pat. No. 3,369,250, issued Feb. 13, 1968, listing Thomas H. Gifft as the inventor.

The present invention includes improvements such as an automatic frequency selector which is used to insure that the signal applied to the facsimile system produces the proper output facsimile. As an example, the facsimile system of the present invention may be used to provide for facsimiles of weather maps which facsimiles are derived from signals sent out by the World Meteorological Organization (WMO). The WMO sends out these facsimile systems in representation of weather maps at periodic times. Included in the signal and prior to the reception of signals representing the facsimile are signals representing a white bar. The automatic frequency selector insures that the white bar is represented as white in the actual facsimile.

The gradations in light and dark in the visual facsimile are determined by frequency changes in the input signal. For example, a high frequency input signal may indicate that the facsimile is to be white whereas a low frequency input signal indicates that the facsimile is to be black. For example, the frequency range of the input signal may be between 2300 to 3100 cycles per second. The automatic frequency selector of the present invention insures that the signal used to produce the facsimile or the facsimile signal is properly representative of the range of frequencies of the input signal. In most prior art systems the facsimile signal has a non-linear response with respect to linear change in frequency. The automatic frequency selector compensates for this non-linear response by using a non-linear charging rate of a capacitor. Also prior art systems cannot response to low frequency signals or respond to rapid changes of the frequency since such prior art systems include filters.

The present invention also includes a plurality of output indicators so that the operator of the facsimile equipment can quickly determine if the input signal is at the proper frequency. For example, when the input signal is representative of the white bar information at the beginning of the facsimile, the output indicators should indicate that white information is being reproduced.

The present invention also includes a system for manually or automatically moving the position of the facsimile on the facsimile paper so that the facsimile is properly oriented on the facsimile paper. In particular the present invention may include an adder-subtracter which adds or subtracts pulses in the speed control and motor drive circuit so as to speed up or slow down the motor drive which in turn changes the position of the facsimile on the facsimile paper as the facsimile is being reproduced. The positioning of the facsimile may be produced automatically using the white bar at the beginning of each facsimile. The information representing the white bar is compared in a phase detector from a signal derived from a drive band which rotates and produces the marking of the paper. The positioning of the facsimile on the facsimile paper may also be produced manually by visually observing the position of the facsimile reproduced on the paper and by manually activating the pulser circuit.

The positioning of the facsimile may also be produced using a voltage controlled oscillator. For example, some input signals provide for a synchronizing signal at the beginning of each line of information. This sync signal may be compared in a phase detector with the signal derived from the drive band to produce a phase error signal. The phase error signal may then be used to control the voltage controlled oscillator.

The present invention also includes an improvement in the movement of the facsimile paper. Specifically the present invention includes the use of canted rollers to create a tension on the paper close to the position where the facsimile is produced. The tension insures the accuracy of the reproduction of the facsimile.

A clearer understanding of the invention will be had with reference to the following description and drawings wherein.

Figure 1:
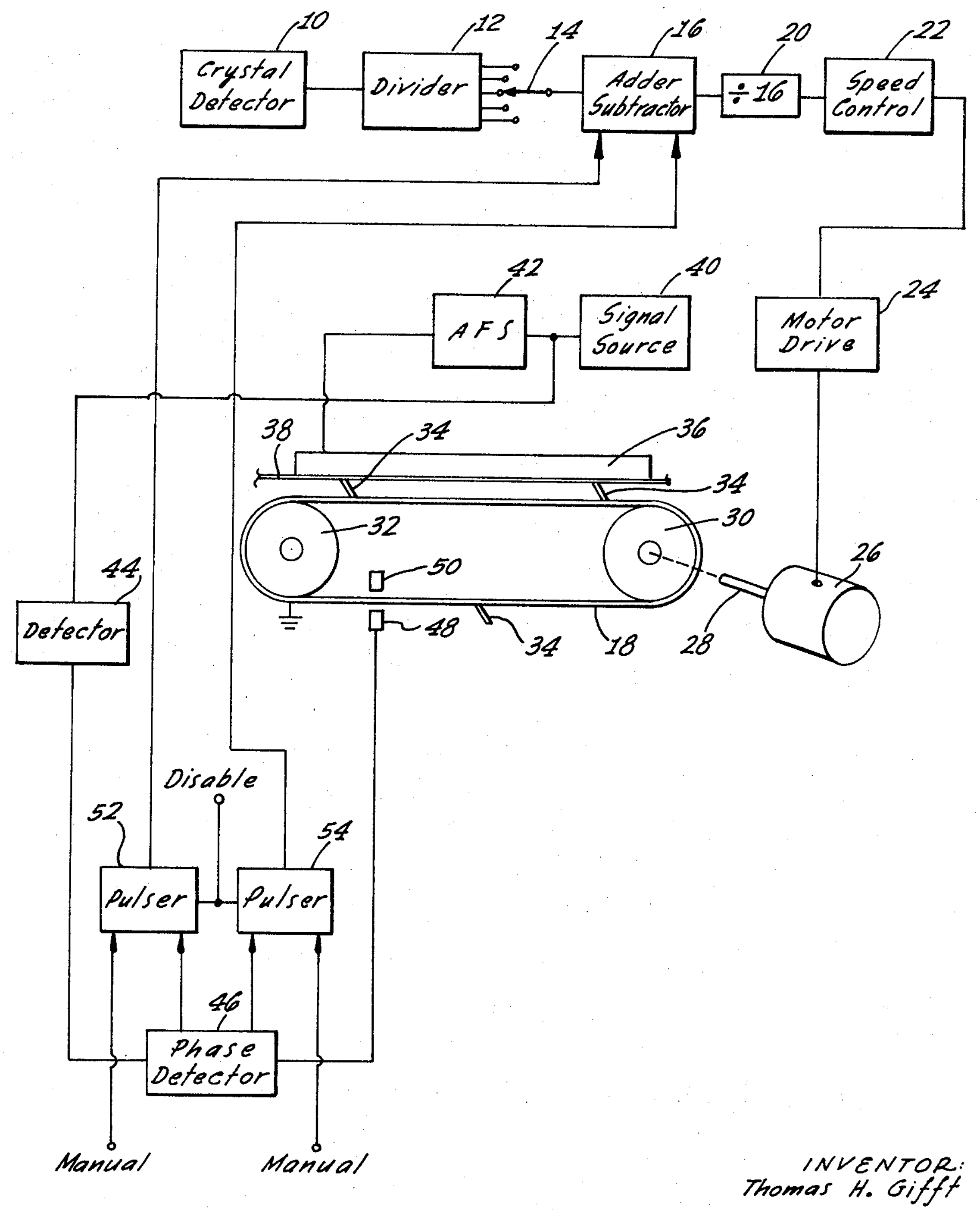
FIG. 1 illustrates in block form a facsimile system including the adder-subtracter sub-system and the automatic frequency selector.

In FIG. 1 a block diagram of a facsimile system is shown. Included in the facsimile system of FIG. 1 is a precision oscillator 10. The oscillator 10 may be of a known type such as a crystal controlled oscillator so as to produce an output signal having a very precise frequency. The output from the crystal oscillator 10 is coupled to a frequency divider 12. The frequency divider 12 may be of a conventional type so as to provide for a plurality of outputs each having a different frequency. The desired one of the output frequencies from the divider 12 may be chosen using a switch 14.

The output from the frequency divider as choosen by the switch 14 is applied to an adder-subtracter 16. The operation of the adder-subtracter will be explained in greater detail but generally the adder-subtracter adds to or subtracts pulses from the output signal from the divider 12 so as to speed up or slow down the rotation of a drive band 18.

The output from the adder-subtracter 16 is applied through a divider 20 to a speed control 22. The divider 20 provides for a division of the signals from the adder-subtracter 16. The divider 20 substantially reduces the frequency of the signal applied to the speed control 22. The speed control 22 may be of any conventional type, and for example, the speed control 22 may be of a phase locking type which would phase lock the signal applied to the speed control 22 from the divider 20 in accordance with a phase locking signal derived from the drive band 18. This type of phase locking system is explained in greater detail in U.S. Pat. No. 3,369,250 and reference is made to that patent for a phase locking speed control system.

The output signal from the speed control 22 is applied to a motor drive 24 which in turn controls a servo motor 26. The servo motor 26 through a shaft 28 rotates a roller mechanism 30. The drive band 18 passes over the roller mechanism 30 and is driven in accordance with the rotation of the roller mechanism 30. The other end of the drive band is supported by a free rotating roller 32.

The drive band 18 carries a plurality of write heads 34. The write heads 34 are positioned at periodic positions around the drive band 18 so that as soon as one head 34 has completed a scan a second one of the heads 34 is just beginning a scan. The heads 34 scan across a blade 36 and when a signal is applied to the blade 36 a current passes from the blade and to the head 34. Interspaced between the head 34 and the blade 36 is a piece of electrochemically coated recording paper 38. Each time the current passes a mark is produced on the paper 38. It is therefore possible to produce a facsimile on a line by line basis in accordance with the signal applied to the blade 36, a scanning of the heads 34 by the drive band 18 and a movement of the paper 38. The facsimile which is produced is in representation of the information contained in the signal to the blade 36.

The facsimile signal coupled to the blade 36 is derived from the signal received by a signal source 40. The signal from the signal source 40 may be signals produced by an organization such as the World Meteorological Organization (WMO). The WMO sends out signals in representation of weather maps but it is to be appreciated that organizations other than the WMO provide facsimile information. The output from the signal source 40 is coupled through an automatic frequency selector 42 to insure that the proper signal is coupled to the blade 36. The operation of the automatic frequency selector 42 will be explained at a later time.

At the beginning of each facsimile is information in representation of a white bar located at the left hand side of the facsimile. It is desirable, of course, that the facsimile be positioned on the paper 38 so that the white bar appears at the left hand side of the paper. The adder-subtracter 16 adds or subtracts pulses until the white bar of information appears at the proper left hand position. The appearance of the white bar information at the beginning of each line is detected by the detector 44 which is resPonsive to a frequency signal in representation of the white information and which detector 44 produces an output pulse signal having a pulse representing the start of each line of information. The output signal from the detector 44 may be compared in a phase detector 46 with a signal from the drive band 18.

The signals from the drive band 18 may be provided by a photocell 48 which is responsive to light from a light source 50. The drive band 18 includes an opening to allow the light from the light source 50 to pass through the drive band and to impinge on the photocell 48 whenever one of the write heads 34 is beginning its scan of the paper 38. Actually a plurality of openings are provided in the drive band representation of the number of write heads 34 so that a signal is produced from the photocell 48 each time one of the write heads 34 is beginning its scan.

The signal from the photocell 48 is compared with the signals from the detector 44 which, as indicated above, represents the white bar of information at the beginning of each line of information. If signals occur at the same time, this indicates that the write head 34 is beginning its scan at the proper time so as to produce the white bar information at the lefthand side of the facsimile paper. If there is a phase difference in the information from the photocell 48 and the detector 44, the phase detector 46 produces one of the two output signals. These output signals from the phase detector 46 depend on whether the output signal from the detector 44 leads or lags the signal from the photocell 48.

Depending on which output signal the phase detector 46 produces, one or the other of the pulsers 52 or 54 is activated which in turn controls the adder-subtracter 16 to add or subtract pulses so as to speed up or slow down the drive band 28 and to move the facsimile to the right or left on the facsimile paper. The pulses are added or subtracted until the white bar of information appears at the lefthand side of the facsimile paper. Once the facsimile is properly positioned on the paper 38 the pulsers 52 and 54 may be disabled using the disable input to the pulsers. The disabling of the pulsers 52 and 54 may be accomplished automatically using an output signal from the phase detector 46 when the signals to the phase detector are in phase. In addition to the automatic operation of the adder-subtracter 16 the pulsers 52 and 54 may be operated manually using the manual inputs to the pulsers 52 and 54.

It can be seen, therefore, in the operation of the system of FIG. 1, thAt the crystal oscillator 10 produces a precise frequency signal and a specific frequency is chosen from the divider 12 by the switch 14. The signal is passed through the adder-subtracter and divided by the frequency divider 20 to be applied to the speed control 22. The speed control 22 controls the motor drive 24 to drive the servo motor 26 which in turn produces a movement of the drive band 18.

The signal source 40 produces the signal output from a source of facsimile information. This information is coupled through the automatic frequency selector to the blade 36. Also the information from the signal source 40 is coupled to the detector 44 which detects the white bar of information which appears at the start of the facsimile. The output from the detector 44 is compared with the output from photocell 48 in a phase detector 46 which in turn controls either a pulser 52 or 54 to control the adder-subtracter 16 to add or subtract pulses so as to properly orient the white bar of information along the left side of the paper 38.

Figure 2:
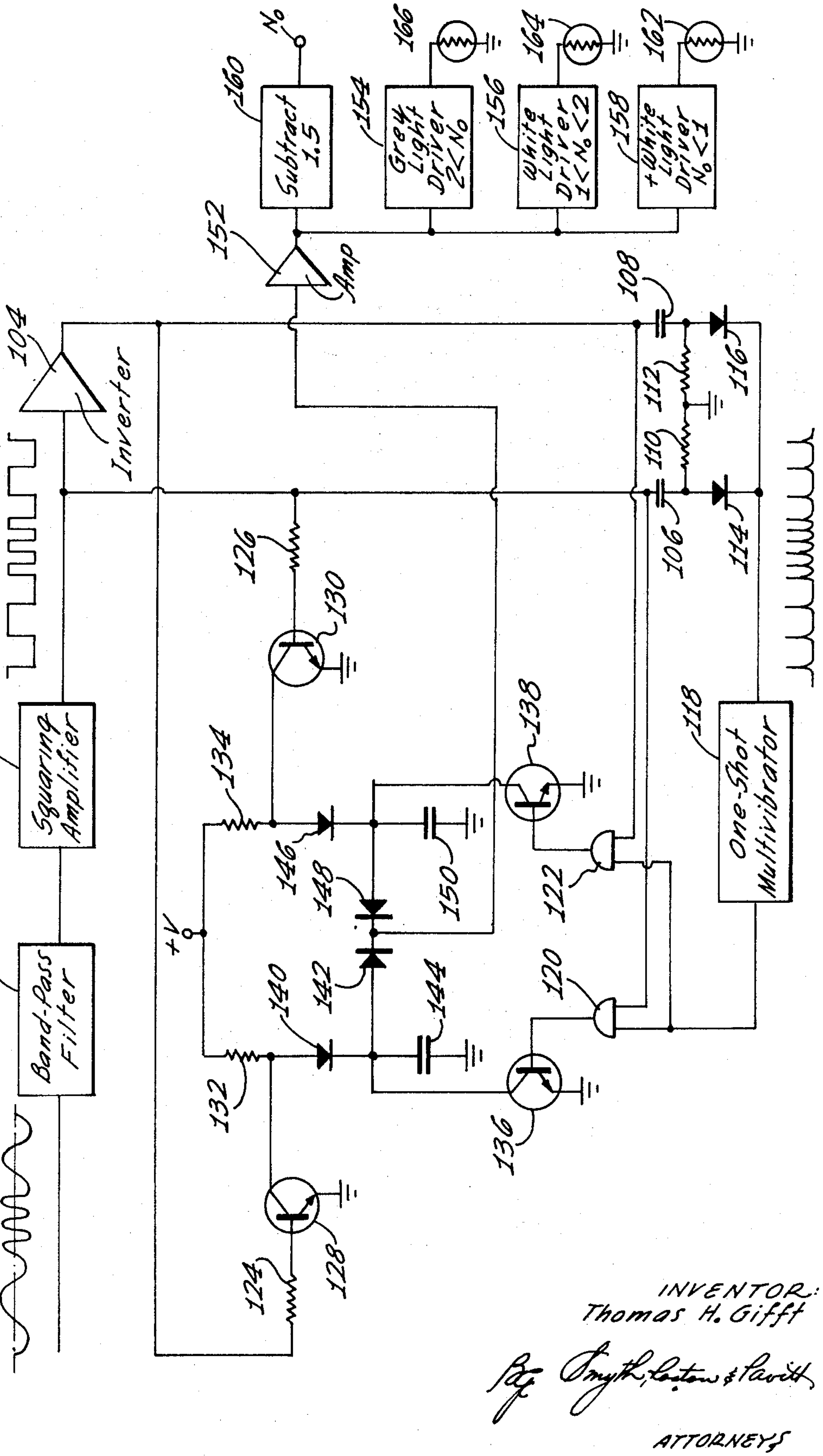
FIG. 2 illustrates partly in block and partly in schematic form an automatic frequency selector which may be used in the system of FIG. 1.

FIG. 2 illustrates in greater detail the operation of the automatic frequency selector 42 of FIG. 1. The signal source 40 shown in FIG. 1 is applied to a bandpass filter 100. The bandpass filter passes only the desired band of frequency representative of desired facsimile information. The output from the bandpass filter is coupled to a squaring amplifier 102. It can be seen that the output of the squaring amplifier 102 is a square wave having the same frequency as the input to the bandpass filter 100. The output from the square amplifier 102 is coupled through an inverter 104.

Both the signal applied to the inverter 104 and the output from the inverter 104 are coupled through differentiators which include capacitors 106, 108 and resistors 110 and 112. The differentiators including the resistors and capacitors 106 through 112 produce pulses at the beginning and end of each pulse in the signal applied to the inverter 104. The outputs from the differentiators are coupled through the diodes 114 and 116 to a one shot multivibrator. Actually, the diodes 114 and 116 only pass pulses in the positive direction and the combination of the inverter 104 and the differentiators and the diodes 114 and 116 produce an input to the one shot multivibrator 118 which has a pulse for each zero crossing of the input signal applied to the bandpass filter 100. The one shot multivibrator 118 produces an output pulse signal having pulses representing each zero crossing of the input signal applied to the bandpass filter 100.

The output from the one shot multivibrator is coupled to the gates 120 and 122. A second input to the gates 120 and 122 is derived from the input to and the output from the invertor 104. In addition the input to and the output from the invertor 104 is coupled through resistors 124 and 126 to the base of transistorS 128 and 130. The collectors of the transistors 128 and 130 are biased from a source of positive voltage through the resistors 132 and 134.

The output of the gates 120 and 122 are coupled to the bases of transistors 136 and 138. The transistors 136 and 138 have grounded emitters. The collectors of transistors 136 and 138 are coupled to two separate terminal points. Specifically, the collector of transistor 136 is coupled to a terminal point formed by diodes 140, 142, and capacitor 144. The collector of transistor 138 is coupled to a terminal point formed by diodes 146, 148 and capacitor 150. An output signal is developed between the junction of diodes 142 and 148 and this output signal is coupled to an amplifier 152.

The output from the amplifier 152 controls three light drivers 154, 156 and 158. The light drivers 154 through 158 produce output signals in accordance with the value of the output signal from the amplifier 152 and the output signals from the light drivers represent the visual conditions of the facsimile. Actually the value of the output signals from the amplifier 152 is larger than the facsimile condition represented by the output signals from the light drivers 154 through 158 by a particular fixed amount. Therefore, the output signal from the amplifier 152 is passed through a subtracter 160 which subtracts the particular fixed amount to provide for the facsimile signal $N_o$ from the automatic frequency selector of FIG. 2.

When the output signal $N_o$ from the automatic frequency selector of FIG. 2 has a particular value less than one, the light driver 158 is activated to control an output light indicator 162. When the value of the output signal $N_o$ from the automatic frequency selector is between one and two, the light driver 156 is controlled to produce an output indication from the light 164. Finally, when the value of the output signal $N_o$ from the automatic frequency selector is greater than two, the light driver 154 is activated to produce an output indicator from the light indicator 166. These values are given as absolute figures but it is to be appreciated that these values may represent particular voltages.

In the operation of the automatic frequency selector of FIG. 2 the capacitors 144 and 150 are charged from the source of positive voltage through the resistors 132 and 134 and the diodes 140 and 146. This charging is alternately interrupted each time either of the transistors 128 and 130 is turned on since the turning on of these transistors provides for a grounding of the path around the capacitors 144 and 150. The capacitors 144 and 150, however, maintain their charge because of the diodes 140 and 146.

Each time the one shot multivibrator 118 produces an output pulse signal, this signal is coupled to the gates 120 and 122. In addition to the signal from the multivibrator 118, the gates 120 and 122 receive signals representing the input to and output from the inverter 104. An output signal is produced from the gates 120 or 122 to control the transistors 136 and 138 when the input signals to the gates are in coincidence. The transistors 136 and 138 are alternatively turned on to short out the capacitors 144 and 150 so as to provide for a discharge of the capacitors.

Therefore, the capacitors 144 and 150 are normally charged from a source of positive volt potential but have this normal charge alternatively interruped in accordance with the frequency of the input signal to the automatic frequency selector of FIG. 2 and have the capacitor alternately discharged in accordance with the frequency of the input signal to the automatic frequency selector of FIG. 2. The above described operations produce a charging of the capacitors 144 and 150 in accordance with the frequency of the input signal to the system of FIG. 2. However, the charging of any capacitor is not completely a linear function and the nonlinearity of the charging of the capacitors actually compensates of the nonlinear frequency response of the signal source 40 of FIG. 1.

The output of the automatic frequency selector is taken from the junction of the diodes 142 and 148 and represents the charge level of one of the two charge capacitors 144 or 150. The amplitude of this output is a linear representation of the frequency of the input signal. The output signal, therefore, has an amplitude value which is linear in accordance with the frequency of the input to the system of FIG. 2. The automatic frequency selector of FIG. 2 serves as a sampling circuit since the capacitors 144 and 150 alternately contain a charge level in accordance with the frequency of the input signal. The output signal is alternately produced by the charge level on one of the capacitors while the other capacitor is undergoing another sample cycle.

This output signal from the junction of the diodes 142 and 148 is passed through the amplifier 152 to raise the value of the signal to a value which is larger than actually desired. In particular, the output from the amplifier 152 has a value which may be, for example, 1.5 volts greater than that actually desired. Therefore, the subtracter 160 substracts 1.5 volts to produce the output signal $N_o$.

The output from the amplifier 152 is used to power the three light drivers 154, 156 and 158. The light driver 154 may produce an output signal to represent the facsimile condition for grey. The driver 156 may produce an output signal to represent the facsimile condition for white and the driver 158 may produce an output signal to represent the facsimile condition for beyond white. It is actually desirable to maintain the output signal $N_o$ so that the facsimile has a proper visual representation of the signal applied to the bandpass filter 100 which signal is derived from the signal source 40, shown in FIG. 1. The signal source 40 may be a tunable receiver. It is desirable to tune the receiver so that the signal applied to the automatic frequency selector shown in FIG. 2 produces the proper value for the output signal $N_o$.

As indicated above, prior to the reception of the actual facsimile system a signal is received which represents a white bar of information. Therefore, when this signal representing a white bar is received, the receiver may be adjusted so that the white light driver 156 produces a visual indication from the light indicator 164. If the receiver is not adjusted properly, the beyond white driver 156 may produce a visual indication from the light indicator 162 to indicate that the proper facsimile image is not being produced in the facsimile system.

It is actually better to have the receiver so that the facsimile image is slightly on the dark side. In order to accomplish this the receiver is tuned so that the white light driver 156 is activated and the grey light driver 154 is periodically activated during the appearance of the white bar of information. This results in the light indicator 162 constantly being on and the light indicator 166 blinking. The lights 162, 164 and 166, therefore, may be used to provide for the proper tuning of the signal received by the automatic frequency selector and wherein the automatic frequency selector provides for an accurate output signal having an amplitude in representation of the linear changes in frequency of the input signal.

Figure 3:
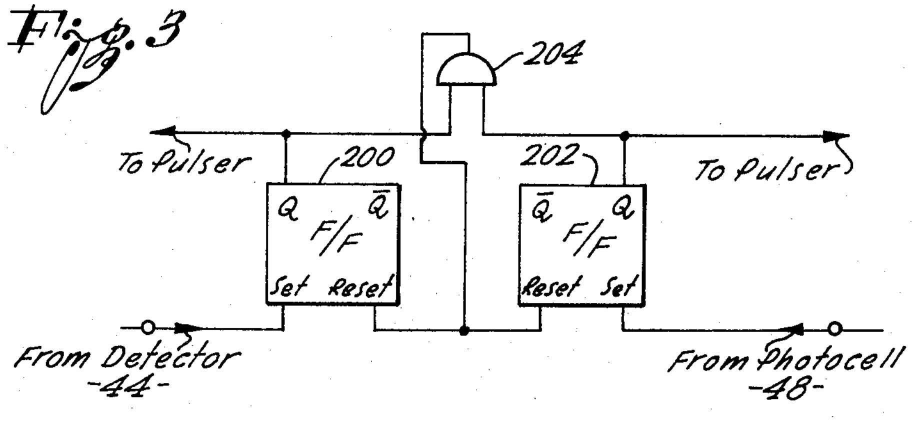
FIG. 3 illustrates a schematic of a phase detector which may be used in the adder-subtracter sub-system included in FIG. 1.

FIG. 3 illustrates a phase detector used in the adder-subtracter system shown in FIG. 1. The phase detector includes a pair of flip-flops 200 and 202. Both flip-flops have set and reset input terminals and corresponding output terminals marked Q and $\bar{Q}$. Flip-flop 200 has an input to the set terminal representative of the input signal from the detector 44 shown in FIG. 1. Flip-flop 202 has an input to the set terminal representative of the signal from the photocell 48 shown in FIG. 1. The outputs from the flip-flops 200 and 202 are from the Q output terminals and are applied to the pulsers 52 and 54 shown in FIG. 1. The outputs from the Q terminals are applied to gate 204. The output from the gate 204 is reapplied as the reset inputs to the flip-flops 200 and 202.

A signal is applied to the flip-flop 200 from the detector 44, so that the flip-flop 200 is in the set condition and a set signal from the flip-flop 200 is applied to the pulser and to the gate 204. When a signal is received from the photocell 48, this signal sets the flip-flop 202 to produce a set signal which is applied to the gate 204. When there is an input to the gate 204 from both flip-flops 200 and 202 an output signal is produced from the gate 204 which immediately resets the flip-flops 200 and 202. The output from the gate 200 is, therefore, on for a period of time representative of the phase error or time difference between the signals from the detector 44 and the photocell 48.

The opposite condition would exist if the initial input to the system of FIG. 3 were from the photocell 48. In this case the flip-flop 202 would be set to produce a set signals which is applied to the pulser and to the gate 204. When a second signal is applied to the flip-flop 200 from the detector 44, this sets the flip-flop 200 and provides a second set signal to the gate 204 so that the gate produces an output signal that immediately resets the flip-flops 200 and 202. The output from the flip-flop 202 is in representation of the phase error or time difference between the signals from the photocell 48 and from the detector 44. The outputs from the flip-flop 200 and 202 are applied to the pulsers 52 and 54 shown in FIG. 1. The pulsers 52 and 54 may have the configuration as shown in FIG. 4.

Figure 4:
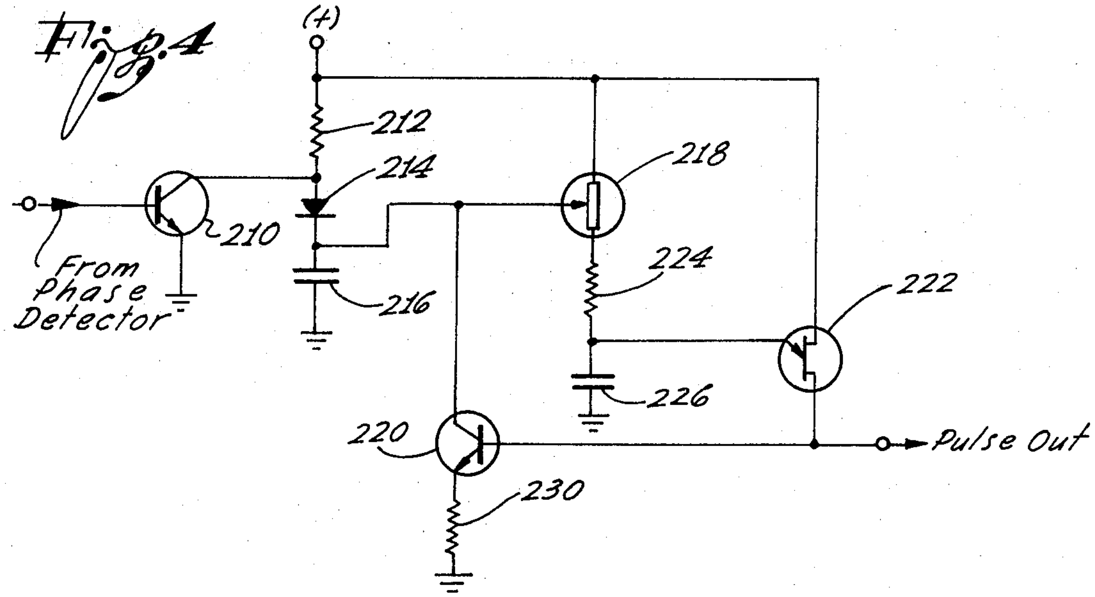
FIG. 4 illustrates a schematic of a pulser which may be used as part of the adder-subtracter sub-system included in FIG. 1.

In FIG. 4 a schematic of a pulser which may be used for either of the pulsers 52 and 54 shown in FIG. 1. The pulser of FIG. 4 includes a transistor 210 which is normally on. The transistor 210 is biased from a source of positive voltage through a resistor 212. A diode 214 and a capacitor 216 is also coupled to the source of positive voltage through the resistor 212. Since the transistor 210 is normally on, the voltage across the diode 214 and the capacitor 216 is normally zero. Therefore, no voltage can be built up across the capacitor 126 until the transistor 210 is cut off. When a signal from the phase detector 46 shown in FIG. 1 is produced, which would be a signal from either the flip-flop 200 or the flip-flop 202 shown in FIG. 3, this signal is applied to the base of the transistor 210. The transistor 210 is cut off from the period of time equal to the phase error or the period of time between the signals from the detector 44 and the photocell 48.

When the transistor 210 is cut off, current passes through the diode 214 to charge up the capacitor 216. The capacitor 216, therefore, charges up to a voltage value in accordance with the phase error between the signals from the detector 44 and from the photocell 48. The voltage across the capacitor 216 is applied to a field effect transistor 218. The field effect transistor 218 is normally off but is turned on when the capacitor 216 is charged.

Also coupled across the capacitor 216 is a transistor 220 which transistor 220 is normally off. The emitter of the transistor 220 is coupled to ground through a resistor 230. The operation of the transistor 220 is controlled by the output from a unijunction transistor 222. The unijunction 222 in turn is controlled by the output of the field effect transistor 218 which output is coupled through a resistor 224 and across a capacitor 226. The actual output signal from he pulser of FIG. 4 is developed across a resistor 228.

In the operation of the pulser of FIG. 4, and as indicated above, the capacitor 216 develops a charge in accordance with the phase error which is represented by the signal from the phase detector. When the capacitor 216 is charged the field effect transistor 218 is turned on to allow current to flow and charge the capacitor 226. When the voltage across the capacitor 226 reaches a predetermined value, the unijunction 222 fires to produce a pulse signal across the resistor 228. The pulse signal across the resistor 228 also is applied as a signal to the base of the transistor 220 to turn on the transistor 220. When the transistor 220 is turned on, this provides for a path to produce a small discharge of the capacitor 216 for a period of time equal to the pulse width of the signal produced by the unijunction 222.

The capacitor 226 discharges through the unijunction 222 and once the capacitor 226 has been discharged, the unijunction 222 is turned off. However, the voltage builds up across the capacitor 226 since the capacitor 216 still retains a charge and when the voltage across the capacitor 226 reaches the predetermined value the unijunction 222 is turned on. It can, therefore, be seen that a pulse signal is developed across the resistor 228 which pulse signal has a number of pulses proportional to the initial charge of the capacitor 216. Each time a pulse is developed across the resistor 228, this provides for a small discharge of the capacitor 216 through the transistor 220. Therefore, the capacitor 216 is discharged in a stepped fashion and the total number of pulses produced in the output signal is in accordance with the initial charge of the capacitor 16. Since the initial charge of the capacitor 16 is proportional to the phase error the total number of pulses is also proportional to the phase error.

Figure 5:
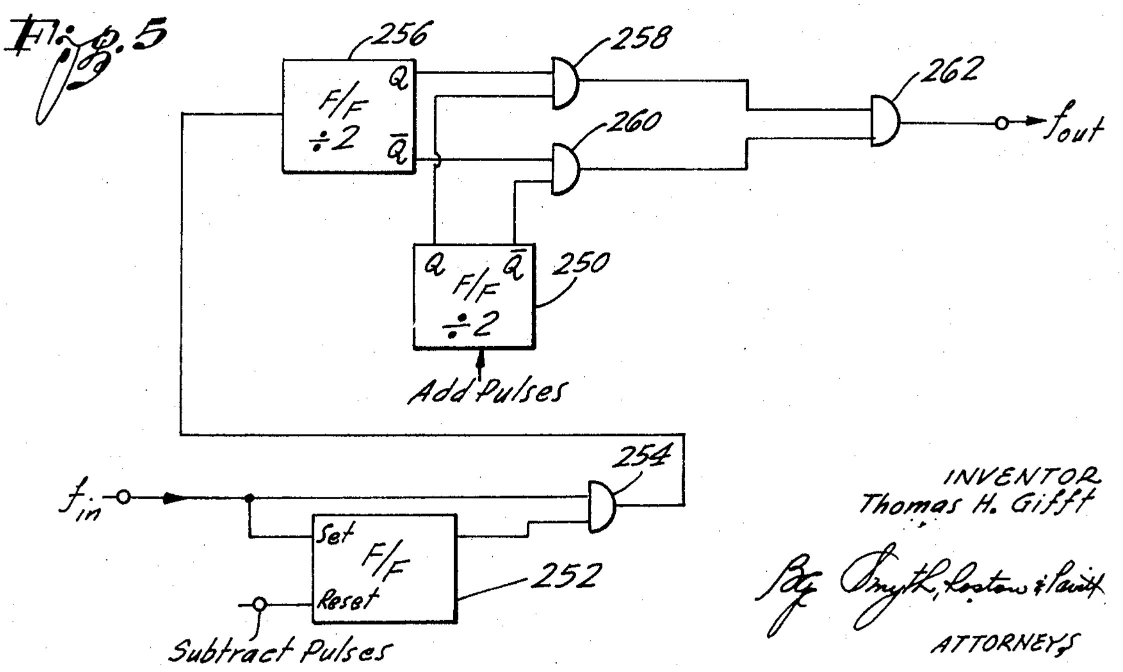
FIG. 5 illustrates a schematic of the adder-subtracter included in the system of FIG. 1.

The output from the pulsers 52 and 54 are applied to the adder-subtracter 16 shown in FIG. 1. The adder-subtracter 16 may be constructed to have the form shown in FIG. 5. In FIG. 5 the add pulses are applied to a flip-flop 250. The subtract pulses are applied to a flip-flop 252. The input signal from the crystal oscillator 10 shown in FIG. 1 which is coupled through the divider 12 is applied to the adder-subtracter of FIG. 5 as the input signal $f_{in}$. This signal $f_{in}$ is applied to the set input of the flip-flop 252 and to a gate 254. A second input to the gate 254 is from the flip-flop 252. The flip-flop 252 may actually consist of a pair of flip-flops which form a counter. When the input signal marked $f_{in}$ is introduced this sets the flip-flop 252 to count to two and to hold at this count of two until the counter receives a subtract pulse.

The gate 254 may be an "and" gate which prevents the passage of a signal unless both inputs are present to the gate 254. Therefore, the gate 254 normally passes the $f_{in}$ signal since the flip-flop 252 normally presents a signal to the gate 254. When a subtract pulse is applied to the counter flip-flop 252 this resets the counter flip-flop 252 to remove the output signal which was applied to the gate 254. At this time the gate 254 prevents the passage of the $f_{in}$ signal until a new set signal is applied to the counter flip-flop 252. The set signal is the next pulse present in the signal $f_{in}$ after the counter flip-flop 252 has been reset. This new pulse sets the counter flip-flop 252 so that it again counts to two and holds at which time an output signal from the flip-flop 252 is again applied to the gate 254.

It can therefore be seen that each time a subtract pulse is applied to reset the flip-flop 252. This has the effect of subtracting a pulse from the input signal $f_{in}$. The counter flip-flop which counts to two is used, since an ordinary flip-flop would be reset by the subtract pulse but, would be set by the next pulse in the input signal $f_{in}$ without having the effect of removing the pulse.

The signal from the gate 254 is applied to a flip-flop 256. The flip-flop 256 divides the signal in half since the flip-flop 256 is switched back and forth between Q and $\overline{Q}$ in accordance with the signal from the gate 254. The outputs from the flip-flop 256 are applied to the pair of gates 258 and 260 which may be "and" gates as first inputs to these gates. The second input to these gates is from the flip-flop 250 which is switched back and forth between Q and $\overline{Q}$ in accordance with the add pulses. The output of the gates 258 and 260 are supplied to a gate 262 which may be on the "or" gate.

Normally one of the output signals from the flip-flop 256 is passed through the gates 258, 260 and 262, to form the output signal $f_o$. When add pulses are applied to he flip-flop 250 this reverses the inputs to the gates 258 and 260 from the flip-flop 250. This has the effect of causing a phase reversal in the output signal from the gate 262 each time there is an add pulse supplied to the flip-flop 250 which phase reversal has the same effect as if an additional impulse had been added to the output signal $f_o$.

Figure 6:
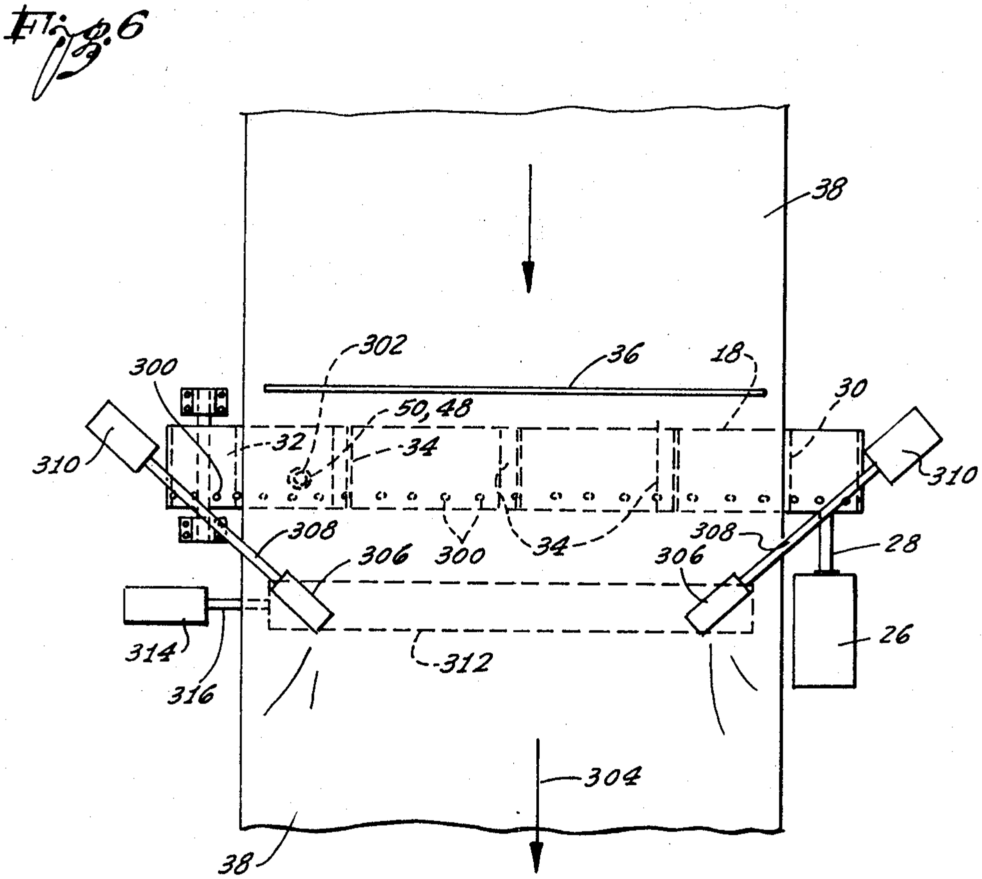
FIG. 6 illustrates the structure of the scanning mechanism including the use of canted rollers to provide for a movement of the facsimile paper.

As a further improvement to the facsimile system, the present invention includes the use of canted rollers to create tension to the paper 38 shown in FIG. 1. The canted rollers may be seen with reference to FIG. 6. In FIG. 6 elements similar to those shown in FIG. 1 will be given similar reference characters. Note, for example, in FIG. 6 that the servomotor 26 drives the roller 30 through the shaft 28. A belt 18 extends around the roller 30 and the idler roller 32. A plurality of openings 300 may be included in the belt 18 to provide an output signal using these openings in conjunction with a light source and a photocell for phase locking the speed control 22 shown in FIG. 1.

The belt 18 may also include openings 302. These openings 302 may be used in conjunction with the source of light 50 and photocell 48 shown in FIG. 1, to produce the control signal used in the adder-subtracter system shown in FIG. 1. The paper 38 is moved in the direction shown by the arrow 304 and at the same time, the belt 18 is rotated by the servomotor 26. Facsimile signals are applied to the blade 36 to pass through the paper 38 to the belt 18. The facsimile signals, therefore, control the production of a mark on the paper 38.

The present invention includes the use of a pair of rollers 306 located at each side of the paper 38. The rollers 306 are spring loaded against the paper 38 through the use of shaft members 308 which are fixed to support members 310. The rollers 306 may be spring loaded and may be arranged so that they can be lifted off the paper. Underneath the paper 38 is a drive mechanism including drive roller 312. The drive 312 is rotated by a motor 314 through a shaft 316.

It can be seen that the rollers 306 are canted relative to the roller member 312. In the operation of the paper drive, the rollers 306 are positioned against the paper to press the paper 38 against the roller 312. The motor 314 is energized to rotate the drive roller 312 and drive the paper 38. As the paper 38 is pulled between the blade 36 and the belt 18 the canted rollers 306 create tension in the paper 38 in the area adjacent to the belt 18 and the blade 36. The paper 38 may be moistened prior to its passage between the belt 18 and the blade 36 so as to insure a good electrical contact for the facsimile signals. Since the paper may be moistened it is especially desirable that the rollers 306 produce the tension so as to insure that the paper does not shrink when it passes from between the blade 36 and the belt 18. If the paper would shrink, the facsimile would be distorted.

Figure 7:
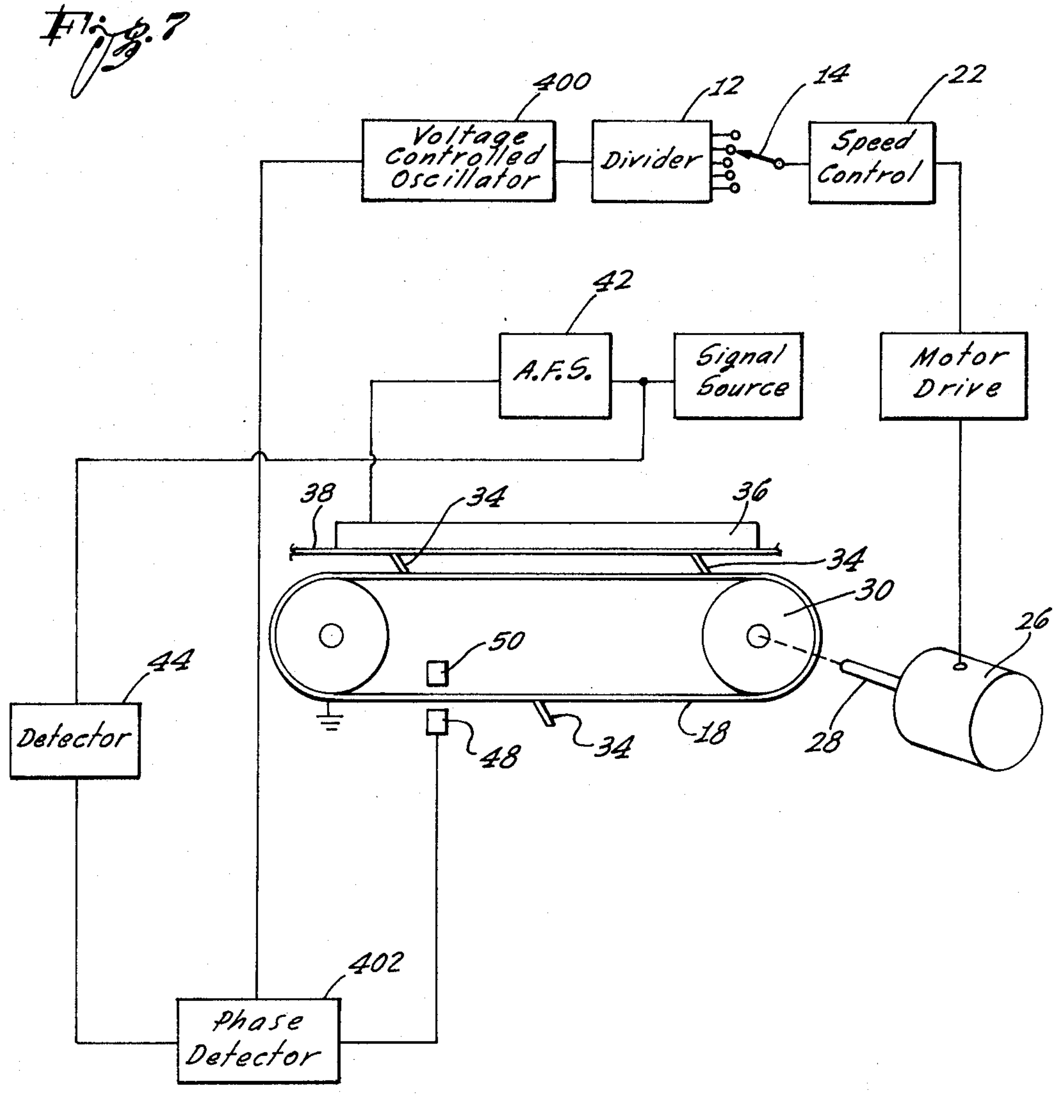
FIG. 7 illustrates in block form a facsimile system including a voltage controlled oscillator to control the position of the facsimile.

FIG. 7 is a second embodiment of the facsimile system including a voltage controlled oscillator to control the position of the facsimile on the paper. Elements in FIG. 7 which are similar to those in FIG. 1 are given the same reference characters.

In FIG. 7 the servo motor 26 is controlled by the motor drive 24. The roller 30 is rotated by the servo motor 26 through the shaft 28. The belt member 18 is positioned around the rollers 30 and 32. The fasimile on the facsimile paper 38 is produced using the blade member 36 and the belt 18. As indicated above, the facsimile is produced by passing a signal between the blade 36 and the belt 18 through the paper 38.

The motor drive 24 is controlled by the speed control 22 which may be of the phase locking type described above. The input to the speed control 22 is from the frequency divider 12, and the input to the frequency divider 12 is from a voltage controlled oscillator 400. It can be seen that if the frequency of the voltage controlled oscillator 400 is varied, this would ultimately result in the varying of the speed of movement of the belt member 18. It is therefore possible to control the position of the facsimile on the paper 38 by controlling the frequency of the voltage controlled oscillator 400.

The signal source 40 receives the facsimile signal from an external source. This facsimile signal is passed through the automatic frequency selector 42 and is then used as the input signal to the blade 36. The facsimile signal used in the system of FIG. 7 is of the type that includes a reference pulse at the beginning of each line of the facsimile information. The reference pulse is detected by the detector 44. The output of the detector is applied to a phase detector 402 as a first signal to the phase detector. The second input signal to the phase detector 402 is produced from the photocell 48 in a similar manner to that described with reference to FIG. 1. The phase detector 402 therefore produces an error signal in accordance with the difference in phase between the two input signals to the phase detector. The difference in phase represents the time difference between the input signals to the phase detector 402 which time difference is representative of the position of the facsimile on the paper 38.

The error signal from the phase detector 402 is applied as the control signal for the voltage controlled oscillator 400. The frequency of the voltage controlled oscillator 400 is therefore varied until the error signal from the phase detector 402 is zero at which time the facsimile is properly positioned on the paper 38.

The system of FIG. 7 may only be used with a facsimile signal which includes a reference pulse at the beginning of each line of facsimile information. The system of FIG. 1 may also be used with a facsimile signal which includes a reference pulse at the beginning of each line of facsimile information but may also be used with a facsimile signal which includes reference information prior to the start of the facsimile information.

The present invention is therefore directed to improvements in a facsimile system of the type shown in U.S. Pat. No. 3,369,250. These improvements insure a more accurate reproduction of a facsimile by providing for a proper tension in the paper so that the paper will not shrink and distort the facsimile. The improvements also include the use of an automatic frequency selector to insure that the signals applied in the facsimile system to produce the facsimile are an accurate representation of the facsimile information. This automatic frequency selector also includes the use of output visual indicators to provide for a proper turning of the input signal. The invention also includes the use of an adder-subtracter sybsystem or a voltage controlled oscillator subsystem to insure the proper positioning of the facsimile on the paper. This positioning of the facsimile on the paper may be accomplished manually or may be accomplished automatically.

The invention although described with reference to particular embodiments is only to be limited by the appended claims.

I claim:

1. A facsimile system for producing a facsimile on facsimile paper from information in an input signal and with the facsimile produced on the facsimile paper by a plurality of write heads responsive to the information and with the write heads spaced around a closed drive band and with a portion of the drive band positioned adjacent to the facsimile paper to have the write heads alternately scanning across the facsimile paper and with the input signal including a periodically recurring sync signal, including:

first means responsive to the periodically recurring sync signal in the input signal for producing a first position signal in accordance with the periodically recurring sync signal;

second means responsive to the scanning of the write heads across the facsimile paper for producing a second position signal in accordance with the start of the scanning of each of the write heads across the facsimile paper, third means coupled to the first and second means and responsive to the first and second control signals for producing an error signal in accordance with the time difference between the periodically recurring sync system and the start of the scanning of each of the write heads on the band across the facsimile paper, and fourth means coupled to the drive band for controlling the speed of the drive band to control the speed of the scanning of the write heads across the facsimile paper and with the fourth means responsive to the error signal produced by the third means to vary the speed of the scanning of the write heads in accordance with the error signal to position the facsimile on the facsimile paper, and wherein the fourth means includes a constant frequency oscillator for producing a pulse signal of a constant frequency and wherein the fourth means includes means for adding or subtracting pulses from the pulse signal produced by the constant frequency oscillator and wherein the means included in the fourth means is responsive to the error signal produced by the third means to add or subtract pulses in accordance with the characteristics of the error signal.

2. The facsimile system of claim 1 wherein the facsimile paper is moved in a direction perpendicular to the path the write heads take in scanning across the facsimile paper and wherein the paper is moved using drive roller means on one side of the paper and a pair of pinch rollers on the other side of the paper at each end of the paper and wherein the rollers are located adjacent to the write heads and wherein the pair of pinch rollers are canted relative to the drive roller means to produce tension in the paper adjacent to the path the write heads take in scanning across the facsimile paper.

3. A facsimile system for producing a facsimile on facsimile paper from information in an input signal and with the facsimile produced on the facsimile paper by a closed drive band supporting a plurality of write heads responsive to the information and alternately scanning across the facsimile paper and with the information in the input signal having variations in frequency in representation of the facsimile, including:

means responsive to the input signal for producing a variable amplitude signal in accordance with the variations in frequency of the input signal and including, capacitance means charging and discharging means responsive to the variations in frequency of the input signal for charging and discharging the capacitance means in accordance with the variations in frequency of the input signal to produce a charge level on the capacitance means having an amplitude in accordance with the charge level on the capacitance means, and means coupled to the capacitance means and to the write heads for coupling the charge level on the capacitance means to the write heads to control the write heads.

4. The facsimile system of claim 3 wherein the capacitance means includes a pair of capacitors and with one capacitor being alternately charged and discharged while the other capacitor is being alternately discharged and charged so that the pair of capacitors alternately sample the frequency of the information in the input signal.

5. The facsimile system of claim 3 wherein the capacitance means is charged from a fixed source of voltage and wherein the charging is interrupted at a frequency in accordance with the frequency of the information in the input signal and wherein the capacitance means is discharged at a frequency in accordance with the frequency of the information in the input signal.

6. The facsimile system of claim 3 wherein the charge level on the capacitance means is also coupled to a plurality of indicator means each responsive to different ranges of charge levels.

7. A facsimile system for producing a facsimile on facsimile paper from information in an input signal and with the facsimile produced on the facsimile paper by a drive band supporting a plurality of write heads responsive to the information and alternately scanning across the facsimile paper and with the input signal including a periodically recurring sync signal, including, first means responsive to the periodically recurring sync signal in the input signal for producing a first position signal in accordance with the periodically recurring sync signal, second means responsive to the scanning of each of the write heads across the facsimile paper for producing a second position signal in accordance with the start of the scanning of each of the write heads across the facsimile paper, third means coupled to the first and second means and responsive to the first and second control signals for producing an error signal in accordance with the time difference between the periodically recurring sync system and the start of the scanning of the write heads across the facsimile paper, fourth means for producing a constant frequency pulse output signal, and fifth means coupled to the third and fourth means and coupled to the write heads for producing a pulse drive signal to control the speed of the drive band to control the rate of scanning of the write heads and with the fifth means responsive to the constant frequency pulse output signal and the error signal to add or subtract pulses from the constant frequency pulse output signal in accordance with the error signal to produce the pulse drive signal.

8. The facsimile system of claim 7 wherein the fifth means includes an adder-subtractor coupled between the fourth means and the write heads and a pair of pulsers coupled between the third means and the adder-subtractor.

9. The facsimile system of claim 7 wherein the periodically recurring sync signal occurs prior to the reception of the facsimile information and wherein the position of the facsimile is adjusted prior to the receiption of the facsimile information,

10. The facsimile system of claim 7 wherein the periodically recurring sync signal occurs prior to each line of facsimile information and wherein the position of the facsimile is adjusted continuously during the reception of the facsimile information.

11. A facsimile system for producing a facsimile on facsimile paper from information in an input signal having variations in frequency in representation of the facsimile and with the facsimile produced on the facsimile paper by a plurality of write heads responsive to the information and with the write heads spaced around a closed drive band and with a portion of the drive band positioned adjacent to the facsimile paper to have the write heads alternately scanning across the facsimile paper and with the input signal including a periodically recurring sync signal, including:

first means responsive to the periodically recurring sync signal in the input signal for producing a first position signal in accordance with the periodically recurring sync signal;

second means responsive to the scanning of the write heads across the facsimile paper for producing a second position signal in accordance with the start of the scanning of each of the write heads across the facsimile paper, third means coupled to the first and second means and responsive to the first and second control signals for producing an error signal in accordance with the time difference between the periodically recurring sync system and the start of the scanning of each of the write heads on the band across the facsimile paper, and fourth means coupled to the drive band for controlling the speed of the drive band to control the speed of the scanning of the write heads across the facsimile paper and with the fourth means responsive to the error signal produced by the third means to vary the speed of the scanning of the write heads in accordance with the error signal to position the facsimile on the facsimile paper, and an automatic frequency selector responsive to the input signal to produce a variable amplitude signal in accordance with the variations in frequencies of the input signal and wherein the automatic frequency selector includes capacitance means alternately charged and discharged in accordance with the frequency of the input signal to produce a charge level on the capacitance means having an amplitude in accordance with the frequency of the input signal and with the charge level on the capacitance means coupled to the write heads in the facsimile system.

* * * * *